United States Patent
Sarkar et al.

(10) Patent No.: US 12,358,286 B2
(45) Date of Patent: Jul. 15, 2025

(54) CALIBRATION TO COMPENSATE FOR PRINT BAR SKEW ANGLE

(71) Applicant: Hewlett-Packard Development Company, L.P., Spring, TX (US)

(72) Inventors: Utpal Kumar Sarkar, Barcelona (ES); Carles Carmona Calpe, Sant Cugat del Valles (ES); David Vendrell Tornero, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 475 days.

(21) Appl. No.: 17/325,737

(22) Filed: May 20, 2021

(65) Prior Publication Data
US 2022/0379612 A1  Dec. 1, 2022

(51) Int. Cl.
*B41J 2/155* (2006.01)
*B41J 29/393* (2006.01)
*G06K 15/02* (2006.01)

(52) U.S. Cl.
CPC ............ *B41J 2/155* (2013.01); *B41J 29/393* (2013.01); *G06K 15/027* (2013.01); *B41J 2029/3935* (2013.01)

(58) Field of Classification Search
CPC ........ B41J 2/155; B41J 2/2146; B41J 29/393; B41J 2029/3935
See application file for complete search history.

(56) References Cited

U.S. PATENT DOCUMENTS

2005/0062784 A1* 3/2005 Matsuzaki ........... B41J 2/04586 347/19
2017/0291410 A1* 10/2017 Kaneko ................ B41J 2/04586

* cited by examiner

*Primary Examiner* — Lam S Nguyen
(74) *Attorney, Agent, or Firm* — Jordan IP Law, LLC (57) ABSTRACT

A pagewide array (PWA) print bar of a printing device prints a calibration pattern on a print medium. The print bar is nominally perpendicular to a media advancement direction in which the print medium advances relative to the PWA print bar during printing. An image of the printed calibration pattern is optically scanned, and a skew angle by which the PWA print bar deviates from true perpendicular to the media advancement direction is calculated based on the optically scanned image. The printing device is calibrated to compensate for the calculated skew angle during subsequent printing.

19 Claims, 5 Drawing Sheets

CALIBRATION TO COMPENSATE FOR PRINT BAR SKEW ANGLE

BACKGROUND

Printing devices output print material onto print media to form images on the print media. Some printing devices eject fluid, such as ink, onto print media, such as paper, to form the images. Such fluid-ejection devices, which can include inkjet-printing devices, may operate in one of two ways.

First, a fluid-ejection device may have a scanning carriage on which one or multiple fluid-ejection printheads are disposed. A print medium is advanced under the carriage and then remains stationary as the carriage scans back and forth over a current swath of the medium to eject fluid onto the swath. The print medium is then advanced to the next swath onto which fluid is to be ejected.

Second, a fluid-ejection device may employ a print bar on which a pagewide array (PWA) of fluid-ejection printheads is disposed. Such a PWA print bar can simultaneously eject fluid onto entire swaths of a print medium as the medium advances under the print bar. The print bar therefore does not have to scan back and forth over a current swath of the medium, and printing occurs more quickly.

DETAILED DESCRIPTION

As noted in the background, a printing device can include a pagewide array (PWA) print bar that prints on swaths of a print medium as the medium is advanced under the print bar. The PWA print bar of such a printing device thus is and remains stationary while printing occurs, in comparison to a printing device that employs a scanning carriage that scans across a current swath of a print medium to print on the swath as the medium temporarily remains stationary. The PWA print bar is nominally perpendicular to the direction in which the print medium advances under or past the print bar during printing.

However, in actuality, due to manufacturing tolerances and other reasons, the PWA print bar of a printing device may deviate from true perpendicular to the direction of media advancement. Deviation of the PWA print bar from true perpendicular to the media advancement direction can affect the quality of the images printed by the printing device. For instance, horizontal lines printed across a print medium that should be perpendicular to the direction of media advancement will be skewed in correspondence with the skew angle of the print bar. A print bar having a skew angle by which the print bar deviates from true perpendicular to the media advancement direction of 0.004 degrees, which is just over $1/100,000$ of a full circle, can result in a deviation of three pixels over a one meter swath and give rise to visible print defects.

For example, a rectangle with two opposing sides parallel to the media advancement direction will in fact be printed as parallelograms that have corner angles that are not equal to 90 degrees. This is because the deviation of the PWA print bar from true perpendicular to the media advancement direction skews just the rectangle's opposing sides that are perpendicular to the media advancement direction, and not the opposing sides that are parallel to the direction of media advancement. As another example, if a printing device is capable of duplex printing, the frontside and backside images on the print medium will be misregistered relative to one another along the direction perpendicular to the direction of media advancement if the PWA print bar deviates from true perpendicular to the media advancement direction.

A printing device having a PWA print bar can have a user-specified parameter indicating the skew angle by which the print bar deviate from true perpendicular to the direction of media advancement. The printing device thus can be calibrated to compensate for the specified skew angle of the PWA print bar. However, because the skew angle is in actuality likely to be quite small, a user may be unable to accurately measure the skew angle. Therefore, printing device calibration to compensate for the deviation of the PWA print bar from true perpendicular to the media advancement direction may in fact degrade, instead of improve, image quality if the skew angle is not accurately specified. A user may have to perform a number of iterations before the printing device is successfully calibrated, and even then calibration may not be ideal.

Techniques described herein provide for calculation of the skew angle by which a PWA print bar of a printing device deviates from true perpendicular to the direction of media advancement. The printing device can then be calibrated to compensate for the skew angle, with such calibration resulting in improved print quality. The described techniques do not rely on a user having to manually measure the skew angle of the print bar, and therefore avoid worsening of print quality due to inaccurate specification of the skew angle. Furthermore, iterative calibration can be avoided, since the skew angle can be accurately determined the first time calibration is performed.

Figure 1A:
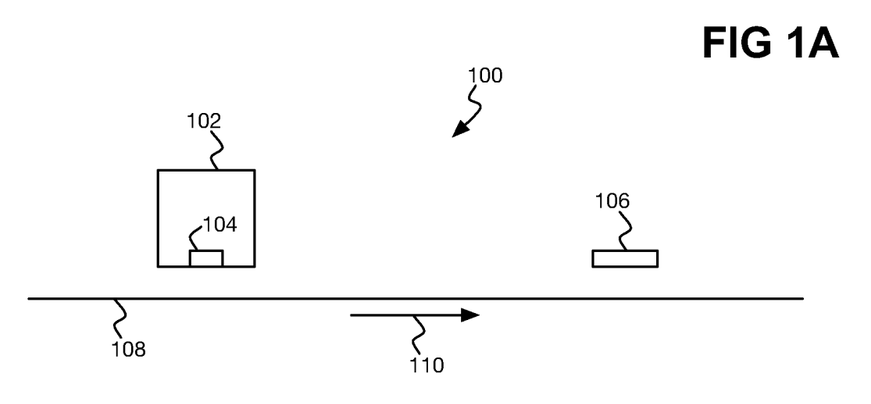
FIGS. 1A and 1B are front and top view diagrams of an example printing device having a pagewide array (PWA) print bar.
Figure 1B:
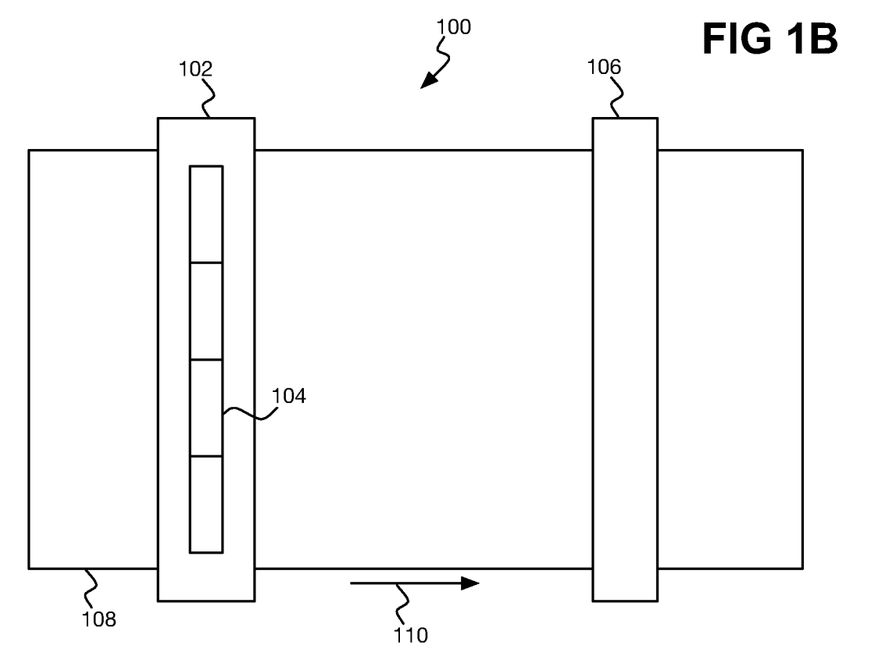

FIGS. 1A and 1B show front and top views, respectively, of an example printing device 100. The printing device 100 includes a print bar 102 having printing mechanisms 104 and an optical scanner 106. The printing device 100 can and does include other components besides those depicted. The printing device 100 prints on a print medium 108 as the medium 108 advances in the media advancement direction 110. The printing mechanisms 104 are organized in a PWA extending over and across the print medium 108 from edge to edge of the medium 108 in a direction perpendicular to the media advancement direction 110, per FIG. 1B. As such, the print bar 102 is considered a PWA print bar 102.

The printing mechanisms 104 may be fluid-ejection printheads, such as inkjet printheads, having nozzles from which print material such as fluid like ink can be ejected to print on the print medium 108 as the medium 108 advances in the direction 110. In the example, the printing mechanisms 104 are arranged end to end across the print medium 108, per FIG. 1B. However, in another implementation, the mechanisms 104 may be staggered or otherwise overlap in arrangement across the print medium 108 in the direction perpendicular to the media advancement direction 110. For illustrative purposes, just four printing mechanisms 104 are shown, but in actuality there can be ten, twenty, thirty, or more such mechanisms 104.

The optical scanner 106 is disposed downstream from the PWA print bar 102 along the media advancement direction 110. Therefore, after the print bar 102 prints on the print medium 108, the optical scanner 106 can optically scan an image of what has been printed. The optical scanner 106 can include light-emitting diodes (LEDs) or other light sources that illuminate the print medium 108 as the medium 108 passes under the scanner 106, and optical sensors that detect the resulting light reflected by the medium 108. The print medium 108 itself can be in the form of individual sheets of media, or may be in the form of a media roll. The print medium 108 may be paper or another type of print media.

Figure 2A:
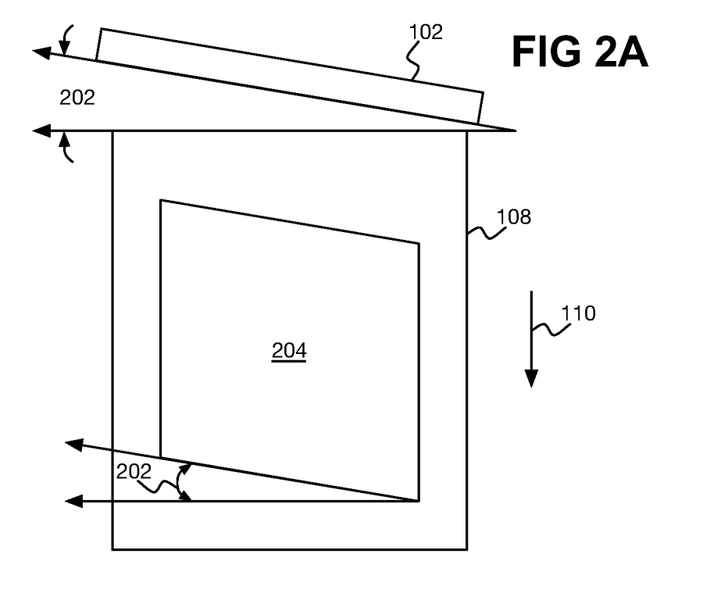
FIGS. 2A and 2B are diagrams depicting example printing by a printing device having a PWA print bar before and after calibration to compensate for deviation of the print bar from true perpendicular to the direction of media advancement under the print bar.
Figure 2B:
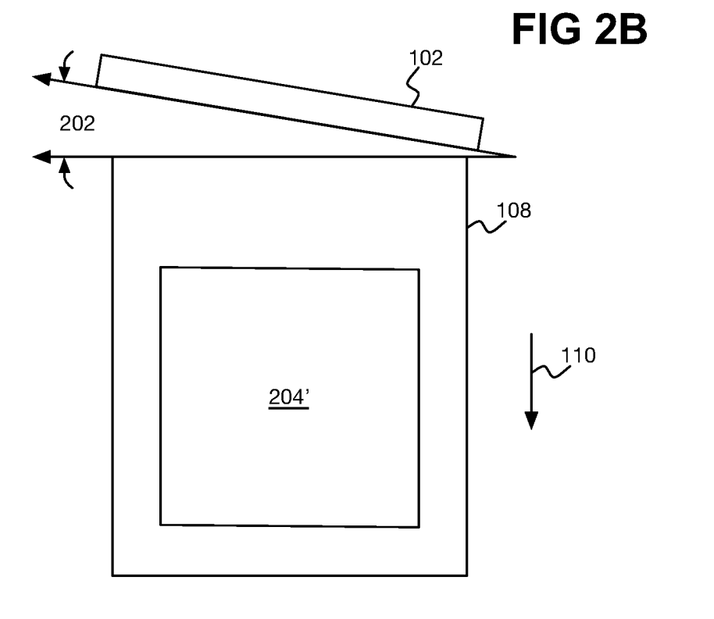

FIGS. 2A and 2B show example printing by the PWA print bar 102 before and after calibration to compensate for deviation of the print bar 102 from true perpendicular to the media advancement direction 110. The PWA print bar 102 is nominally perpendicular to the media advancement direction 110. However, in actuality, the PWA print bar 102 deviates from true perpendicular (i.e., exactly 90 degrees) to the media advancement direction 110 by a skew angle 202. The skew angle 202 is exaggerated in FIGS. 2A and 2B for illustrative purposes, and in actuality may measure less than three degrees depending on manufacturing tolerances during fabrication of the printing device 100.

Per FIG. 2A, prior to calibration of the printing device 100 to compensate for the skew angle 202 of the PWA print bar 102, a rectangle to be printed on the print medium 108 is actually printed as a non-rectangular parallelogram 204 having leading and trailing sides that are skewed by the same angle 202 as the print bar 102 itself. That is, the leading and trailing sides of the rectangle should be printed perpendicular to the media advancement direction 110, but the actually printed parallelogram 204 has leading and trailing sides that deviate from true perpendicular to the media advancement direction 110 by the skew angle 202. The printed parallelogram 204 therefore has corner angles that are not equal to 90 degrees and is not a rectangle.

By comparison, per FIG. 2B, subsequent to calibration of the printing device 100 to compensate for the skew angle 202 of the PWA print bar 102, the rectangle to be printed on the print medium 108 is actually printed as a rectangle 204'. Because the printing device 100 has been calibrated in this manner, in other words, the leading and trailing sides of the rectangle 204' are printed perpendicular to the media advancement direction 110, and the rectangle has corner angles equal to 90 degrees. Therefore, calibration of the printing device 100 to compensate for the deviation of the print bar 102 from true perpendicular to the media advancement direction 110 improves print quality, because the image (viz., a rectangle in the example) are more faithfully printed.

Figure 3A:
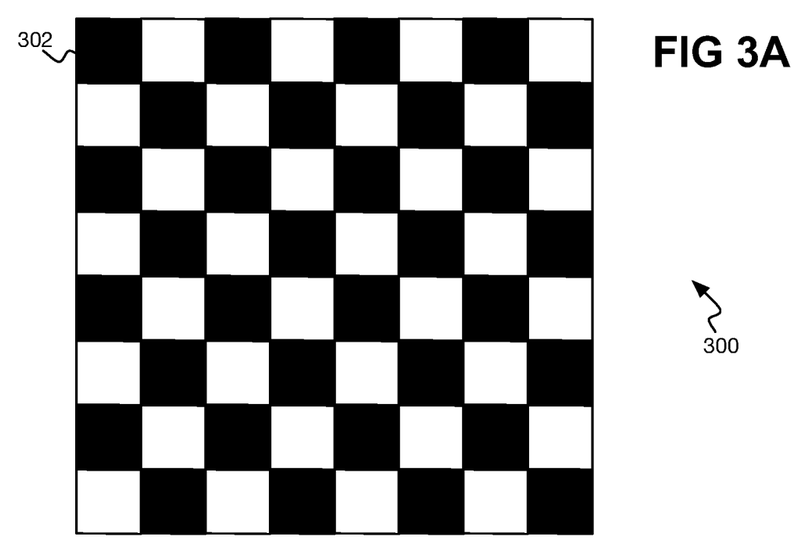
FIGS. 3A and 3B are diagrams of an example calibration pattern to be printed (FIG. 3A) and as printed (FIG. 3B) by a printing device having a PWA print bar that deviates from true perpendicular to the direction of media advancement under the print bar, for determining the skew angle of such deviation on which basis the printing device can be calibrated.
Figure 3B:
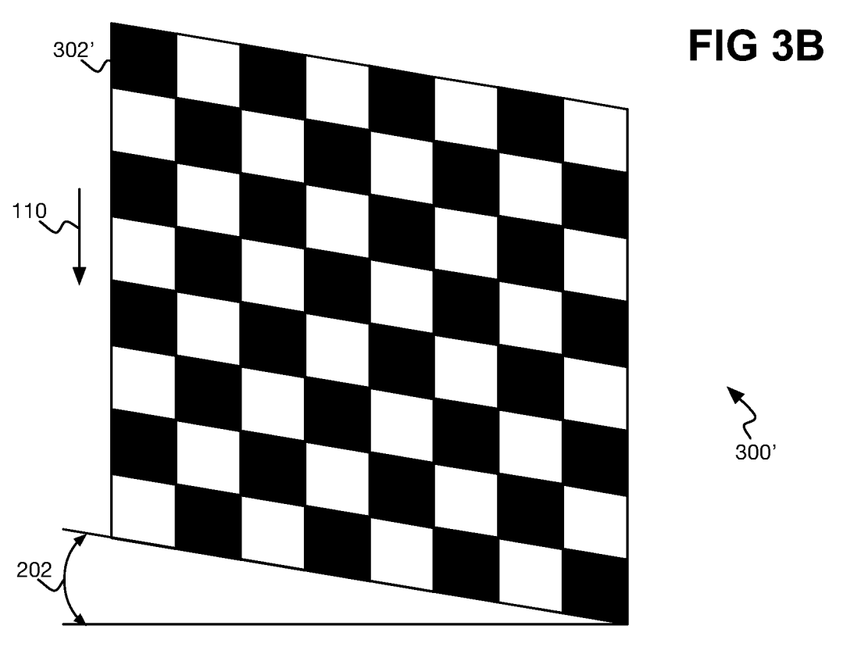

FIGS. 3A and 3B respectively show an example calibration pattern 300 to be printed by the printing device 100 having the PWA print bar 102 that deviates from true perpendicular to the media advancement direction 110, and the calibration pattern 300' as actually printed by the printing device 100 prior to calibration. Per FIG. 3A, the calibration pattern 300 is a checkered pattern (i.e., a checkerboard pattern) of squares 302. The squares 302 can more generally be rectangles, can even more generally still be polygons other than rectangles, and can most generally be shapes other than polygons.

Per FIG. 3B, the calibration pattern 300 is printed by the PWA print bar 102 of the printing device 100 as the calibration pattern 300' prior to calibration. The squares 302 of the calibration pattern 300 are therefore printed as non-square (i.e., non-rectangular) parallelograms 302' having the same skew angle 202 by which the print bar 102 deviates from true perpendicular to the media advancement direction 110. The printed calibration pattern 300' as a whole as well as each individual parallelogram 302' thus has the skew angle 202.

Measurement of the skew angle 202 from the printed calibration pattern 300' therefore permits the printing device 100 to be calibrated to compensate for the skew angle 202. More specifically, the calibration pattern 300 can be printed on the print medium 108 by the PWA print bar 102 of the printing device 100. The resulting printed calibration pattern 300' can then be optically scanned by the optical scanner 106 of the printing device 100. Finally, the skew angle 202 can be calculated based on resulting optically scanned image of the printed calibration pattern 300', and the printing device 100 accordingly calibrated. How the skew angle 202 can be calculated from the optically scanned image of the printed calibration pattern 300' is now described in detail.

Figure 4:
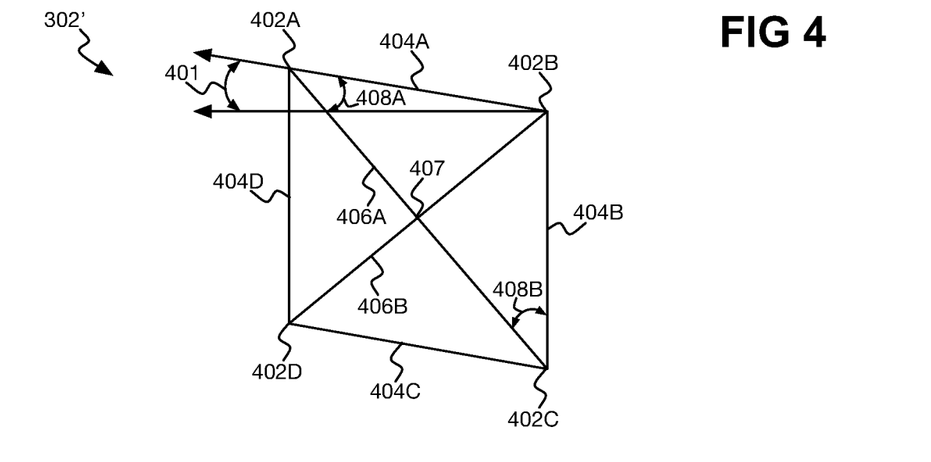
FIG. 4 is a diagram of an example parallelogram of the calibration pattern of FIG. 3B, in relation to which the skew angle by which the PWA print bar of a printing device deviates from true perpendicular to the direction of media advancement under the print bar can be determined.

FIG. 4 shows an example parallelogram 302' of the printed calibration pattern 300'. The parallelogram 302' has a skew angle 401 that corresponds to the skew angle 202 of the PWA print bar 102. The parallelogram 302' has first, second, third, and fourth corners 402A, 402B, 402C, and 402D, which are collectively referred as the corners 402. The parallelogram 302' further has first, second, third, and fourth sides 404A, 404B, 404C, and 404D, which are collectively referred to as the sides 404. The sides 404A and 404B meet at the corner 402B; the sides 404B and 404C meet at the corner 402C; the sides 404C and 404D meet at the corner 402D; and the sides 404D and 404A meet at the corner 402A.

The corners 402A and 402B are edge-collinear with one another along the side 404A; the corners 402B and 402C are edge-collinear along the side 404B; the corners 402C and 402D are edge-collinear along the side 404C; and the corners 402D and 402A are edge-collinear along the side 404D. The corners 402A and 402C are opposite one another, as are the corners 402B and 402D. A line 406A can be considered as extending (but which does not actually extend) between the opposing corners 402A and 402C, and a line 406B can similarly be considered as extending (but which does not actually extend) between the opposing corners 402B and 402D. The lines 406A and 406B can be collectively referred to as the lines 406, and intersect at a center point 407 of the parallelogram 302'.

The parallelogram 302' has what is referred to as a first cross angle 408A that is equal to the angle between the side 404A and the line 406A extending between the opposing corners 402A and 402C. The parallelogram 302' similarly has a second cross angle 408B that is equal to the angle between the side 404B and the line 406A extending between the opposing corners 402A and 402C. The first and second cross angles 408A and 408B may be collectively referred to as the cross angles 408.

Figure 5:
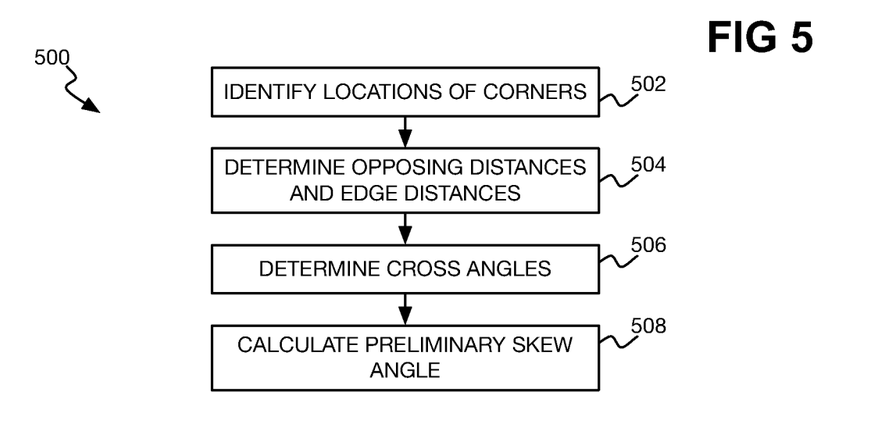
FIG. 5 is a flowchart of an example method for calculating the (preliminary) skew angle by which the PWA print bar of a printing device deviates from true perpendicular to the direction of media advancement under the print bar from the parallelogram of FIG. 4.

FIG. 5 shows an example method 500 for calculating the skew angle 401 of the printed parallelogram 302' as captured within an optically scanned image. Locations of the corners 402 of the parallelogram 302' are identified within the optically scanned image (502). In one implementation, just the locations of the corners 402A and 402B may be identified, in which case the location of the center point 407 of the parallelogram 302' may also be identified. By comparison, in another implementation, all the corners 402 may be identified. Identification of the location of a corner 402 means that the corner 402 is detected within the optically scanned image and its location specified within a coordinate system, such as a Cartesian coordinate system.

Opposing distances of the parallelogram 302' are determined, as are edge distances of the parallelogram 302' (504). For instance, a first opposing distance between the opposing corners 402A and 402C may be determined, which is the length of the line 406A extending between the corners 402A and 402C. A second opposing distance between the opposing corners 402B and 402D may also be determined, which is the length of the line 406B extending between the corners 402B and 402D. A first edge distance between the corners 402A and 402B may be determined, which is the length of the first side 404A. A second edge distance between the corners 402B and 402C may also be determined, which is the length of the second side 404B.

As noted, in one implementation, the locations of all the corners 402 of the parallelogram 302' are identified within the optically scanned image. In this case, the first opposing distance may be determined by calculating the absolute distance between the coordinates of the corner 402A and the coordinates of the corner 402C. The second opposing distance may likewise be determined by calculating the absolute distance between the coordinates of the corner 402B and the coordinates of the corner 402D. The first edge distance may similarly be determined by calculating the absolute distance between the coordinates of the corner 402A and the coordinates of the corner 402B, and the second edge distance may be determined by calculating the absolute distance between the coordinate of the corner 402B and the coordinates of the corner 402C.

As also noted, in another implementation, the locations of just the locations of the corners 402A and 402B are identified within the optically scanned image. In this case, the first opposing distance may be determined by calculating and then doubling the absolute distance between the coordinates of the corner 402A and the coordinates of the center point 407. The second opposing distance may likewise be determined by calculating and then doubling the absolute distance between the coordinates of the corner 402B and the coordinates of the center point 407. The first edge distance may be determined by calculating the absolute distance between the coordinates of the corner 402A and the coordinates of the corner 402B. However, the second edge distance is determined later and in a different way, since the location of the corner 402C was not identified.

The cross angles 408 are determined (506), based on the first and second opposing distances and the first and second edge distances that have been determined. The first cross angle 408A can be calculated as:

$$X = \cos^{-1}\left(\frac{c^2 + \left(\frac{e}{2}\right)^2 - \left(\frac{f}{2}\right)^2}{c \cdot e}\right),$$

where X is the first cross angle 408A, c is the first edge distance, e is the first opposing distance, and f is the second opposing distance. In the implementation in which just the locations of the corners 402A and 402B are identified within the optically scanned image, the second edge distance can then be calculated as $$d=\sqrt{c^2+e^2-(2 \cdot c \cdot e \cdot \cos(X))},$$

where d is the second edge distance. The second cross angle 408B can be calculated as $$Y = \cos^{-1}\left(\frac{e^2 - c^2 + d^2}{2 \cdot e \cdot d}\right),$$

where Y is the second cross angle 408B.

The skew angle 401 of the parallelogram 302' is then calculated based on the first and second cross angles 408A and 408B that have been determined (508), and thus based more indirectly on the opposing distances and edge distances that have been determined and most indirectly on the optically scanned image of the parallelogram 302'. The skew angle 401 can be calculated as $$\alpha = -\left(X + Y - \frac{\pi}{2}\right).$$

The skew angle 401 of the parallelogram 302' can be referred to as a preliminary skew angle to differentiate the skew angle 401 from the skew angle 202 of the PWA print bar 102 of the printing device 100.

In principle, the skew angle 401 of each parallelogram 302' of the printed calibration pattern 300' as captured within the optically scanned image is equal to the skew angle 202 of the PWA print bar 102 of the printing device 100. However, any errors that occur during printing of the calibration pattern 300 or during scanning the resulting printed calibration pattern 300' can cause individual skew angles 401 of the parallelograms 302' to vary from the actual skew angle 202 of the print bar 102. Therefore, the skew angle 202 by which the print bar 102 deviates from the true perpendicular to the media advancement direction 110 may be determined based on the preliminary skew angles 401 that have been calculated for respective parallelograms 302' of the printed calibration pattern 300' as captured within the optically scanned image.

Figure 6:
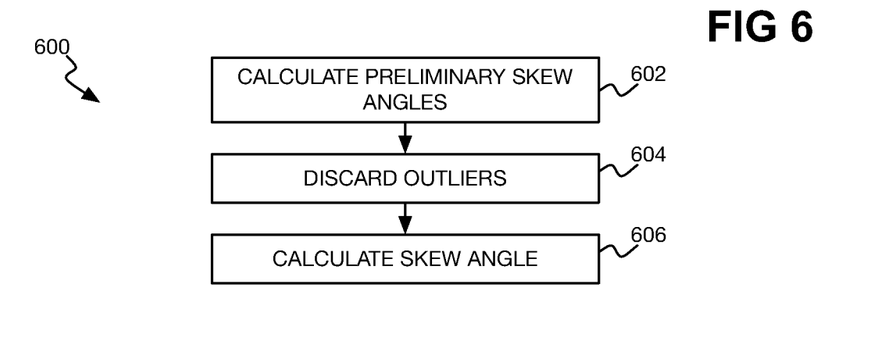
FIG. 6 is a flowchart of an example method for calculating the skew angle by which the PWA print bar of a printing device deviates from true perpendicular to the direction of media advancement under the print bar from the preliminary skew angle calculated for each parallelogram of the calibration pattern of FIG. 3B.

FIG. 6 shows a method 600 for calculating the skew angle 202 of the PWA print bar 102 based on the optically scanned image of the printed calibration pattern 300'. Preliminary skew angles 401 of the parallelograms 302' of the printed calibration pattern 300' are individually calculated (602). That is, the preliminary skew angle 401 of each parallelogram 302' is calculated. Such calculation may be achieved by performing the method 500 that has been described.

In one implementation, each preliminary skew angle 401 that is an outlier can be discarded (604). As one example, skew angles 401 that differ by more than a threshold number of standard deviations from the mean or median of the preliminary skew angles 401 may be discarded. The skew angle 202 of the PWA print bar 102 can then be determined based on the preliminary skew angles 401 that remain (606). For example, the skew angle 202 may be determined as the mean, median, or other statistical function of the preliminary skew angles 401 that remain.

Figure 7:
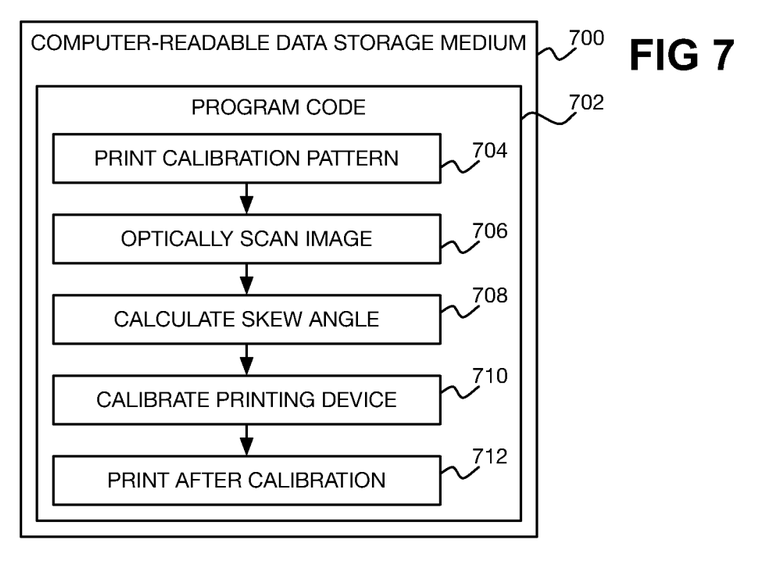
FIG. 7 is a diagram of an example non-transitory computer-readable data storage medium.

FIG. 7 shows an example non-transitory computer-readable data storage medium 700 storing program code 702 executable by a processor of a device, such as a printing device like the printing device 100, or a computing device like a computer, to which the printing device is communicatively connected. The program code 702 is executable by the processor to perform processing. The processing includes printing a calibration pattern on a print medium using a PWA print bar nominally perpendicular to a media advancement direction in which the print medium advances relative to the PWA print bar during printing (704).

The processing includes optically scanning an image of the printed calibration pattern (706), and calculating a skew angle by which the PWA print bar deviates from true perpendicular to the media advancement direction based on the optically scanned image (708). The processing includes calibrating the printing device including the PWA print bar to compensate for the calculated skew angle during subsequent printing (710). The processing can thus include printing an image using the PWA print bar after calibration of the printing device to compensate for the calculated skew angle (712).

Figures 8, 9:
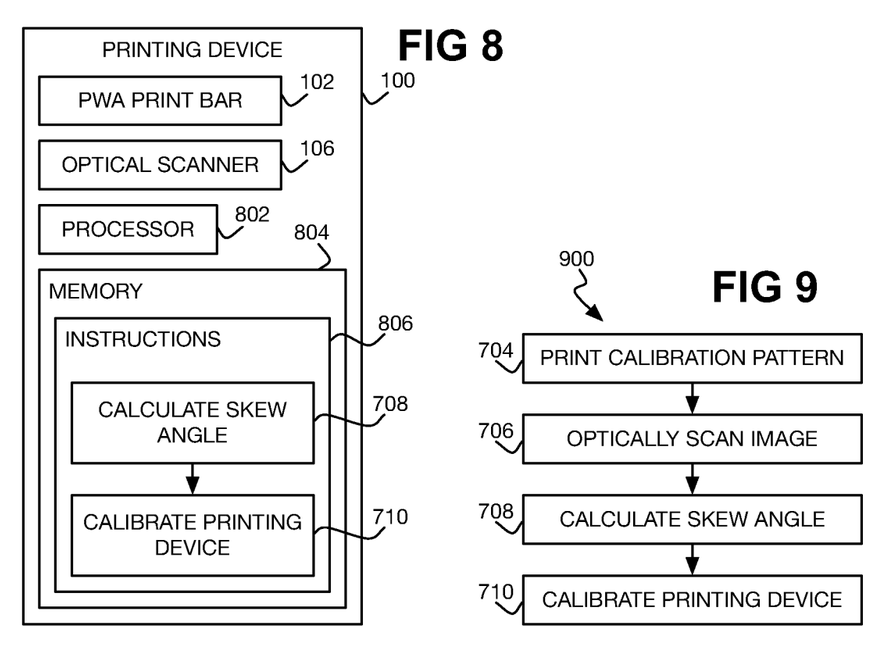
FIG. 8 is a block diagram of an example printing device.
FIG. 9 is a flowchart of an example method.

FIG. 8 shows a diagram of the example printing device 100. The printing device 100 includes the PWA print bar 102 to print a calibration pattern on a print medium. The PWA print bar 102 is nominally perpendicular to a media advancement direction in which the print medium advances relative to the PWA print bar 102 during printing. The printing device 100 includes the optical scanner 106 to optically scan an image of the printed calibration pattern.

The printing device 100 includes a processor 802, and a memory 804 storing instructions 806 executable by the processor 802. The instructions 806 are executable by the processor 802 to calculate a skew angle by which the PWA print bar 102 deviates from true perpendicular to the media advancement direction based on the optically scanned image (708). The instructions 806 are executable by the processor 802 to further calibrate the printing device 100 to compensate for the calculated skew angle during subsequent printing (710).

The optical scanner 106 can be positioned downstream from the PWA print bar 102 along the media advancement direction, as has been noted. As such, the optical scanner 106 can optically scan the image of the printed calibration pattern after the PWA print bar 102 has printed the calibration pattern, without a user having to feed the print medium back into the printing device for optical scanning after printing has occurred. Therefore, the user can initiate calibration, with calibration being thereafter performed automatically without any user interaction.

FIG. 9 shows an example method 900. At least some parts of the method 900 can be implemented as program code stored on a non-transitory computer-readable data storage medium and executed by a processor. The processor may be part of a printing device to be calibrated, or may be part of a computing device communicatively connected to the printing device.

The processor may be any combination of hardware and programming to implement the functionalities described herein. These combinations of hardware and programming may be implemented in a number of different ways. In certain implementations, the programming for the processor, and its component parts, may be in the form of processor executable instructions stored on at least one non-transitory machine-readable storage medium and the hardware for the engines may include at least one processing resource to execute those instructions. The processing resource may form part of a printing device within the printing system, or a computing device that is communicatively coupled to the printing device. In some implementations, the hardware may include electronic circuitry to at least partially implement the processor. For example, the processor may comprise an application-specific integrated circuit that forms part of a printing device within the printing system.

The method 900 includes printing, by a PWA print bar of the printing device, a calibration pattern on a print medium (704). The PWA print bar is nominally perpendicular to a media advancement direction in which the print medium advances relative to the PWA print bar during printing. The method 900 further includes optically scanning, by an optical scanner, an image of the printed calibration pattern (706). The method includes calculating, by the processor, a skew angle by which the PWA print bar deviates from true perpendicular to the media advancement direction based on the optically scanned image (708). The method 900 includes calibrating the printing device to compensate for the calculated skew angle during subsequent printing (710).

In one implementation, the optical scanner that optically scans an image of the printed calibration pattern may be part of the same printing device as the PWA print bar. However, in another implementation, the optical scanner may be part of a scanning device separate from the printing device. In such an implementation, the processor may be part of a computing device separate from both the scanning device and the printing device. A user may thus cause the printing device to print the calibration pattern, and then cause the scanning device to scan the printed calibration pattern. Upon the computing device calculating the skew angle based on the resulting optically scanned image, the user may then input the skew angle into the printing device for calibration, or the computing device itself may calibrate the printing device.

Techniques have been described for calibrating a printing device to compensate for the skew angle by which a PWA print bar deviates from true perpendicular to the direction of media advancement. The techniques specifically pertain to determining the skew angle of the PWA print bar without a user having to manually measure the skew angle. Rather, the skew angle is calculated based on an optically scanned image of a calibration pattern printed by the PWA print bar.

We claim:

1. A non-transitory computer-readable data storage medium storing program code executable by a processor to perform processing comprising:

printing a polygon calibration pattern on a print medium using a pagewide array (PWA) print bar nominally perpendicular to a media advancement direction in which the print medium advances relative to the PWA print bar during printing;

optically scanning an image of the printed polygon calibration pattern;

calculating a skew angle by which the PWA print bar deviates from true perpendicular to the media advancement direction based on the optically scanned image; and calibrating a printing device including the PWA print bar to compensate for the calculated skew angle during subsequent printing.

2. The non-transitory computer-readable data storage medium of claim 1, wherein the processing further comprises:

printing an image using the PWA print bar after calibration of the printing device to compensate for the calculated skew angle.

3. The non-transitory computer-readable data storage medium of claim 1, wherein calculating the skew angle comprises:

identifying locations of corners of a polygon of the printed polygon calibration pattern within the optically scanned image; and calculating the skew angle based on the identified locations of the corners of the polygon within the optically scanned image.

4. The non-transitory computer-readable data storage medium of claim 1, wherein the polygon calibration pattern comprises a rectangle, the printed polygon calibration pattern comprises a parallelogram, and calculating the skew angle comprises:

identifying locations of corners of the parallelogram within the optically scanned image, including a first corner and a second corner edge-collinear with the first corner within the parallelogram;

determining a first opposing distance between the first corner and a third corner opposite the first corner and edge-collinear with the second corner within the parallelogram, a second opposing distance between the second corner and a fourth corner opposite the second corner and edge-collinear with each of the first and third corners within the parallelogram, a first edge distance between the first and second corners, and a second edge distance between the second and third corners; and calculating the skew angle based on the determined first and second opposing distances and the determined first and second edge distances.

5. The non-transitory computer-readable data storage medium of claim 4, wherein the locations of the corners of the parallelogram identified within the optically scanned image further include the third and fourth corners.

6. The non-transitory computer-readable data storage medium of claim 4, wherein the rectangle comprises a square.

7. The non-transitory computer-readable data storage medium of claim 1, wherein the polygon calibration pattern comprises a rectangle, the printed polygon calibration pattern comprises a parallelogram having a first side, a second side, a third side parallel to and opposite the first side, and a fourth side parallel to and opposite the second side, and calculating the skew angle comprises:

identifying locations of corners of the parallelogram within the optically scanned image, including a first corner at which the first and fourth sides meet and a second corner at which the first and second sides meet;

determining a first opposing distance between the first corner and a third corner at which second and third sides meet, a second opposing distance between the second corner and a fourth corner at which the third and fourth sides meet, a first edge distance between the first and second corners, and a second edge distance between the second and third corners;

determining a first cross angle between the first side and a line extending between the first and third corners, and a second cross angle between the second and the line extending between the first and third corners, based on the determined first and second opposing distances and the determined first and second edge distances; and calculating the skew angle based on the determined first and second angles.

8. The non-transitory computer-readable data storage medium of claim 7, wherein the locations of the corners of the parallelogram identified within the optically scanned image further include the third and fourth corners.

9. The non-transitory computer-readable data storage medium of claim 7, wherein the rectangle comprises a square.

10. The non-transitory computer-readable data storage medium of claim 1, wherein the polygon calibration pattern comprises a checkered pattern of polygons, and calculating the skew angle comprises:

calculating a preliminary skew angle for each polygon of the checkered pattern; and calculating the skew angle based on the calculated preliminary skew angle for each polygon.

11. The non-transitory computer-readable data storage medium of claim 10, wherein calculating the skew angle based on the calculated preliminary skew angle for each polygon comprises:

discarding the preliminary skew angle for each polygon that is an outlier; and calculating the skew angle based on the calculated preliminary skew angle for each polygon that remains after discarding.

12. The non-transitory computer-readable data storage medium of claim 10, wherein calculating the skew angle based on the calculated preliminary skew angle for each polygon comprises:

calculating the skew angle as a statistical function of the preliminary skew angle for each polygon.

13. A printing device comprising:

a pagewide array (PWA) print bar to print a polygon calibration pattern on a print medium, the PWA print bar nominally perpendicular to a media advancement direction in which the print medium advances relative to the PWA print bar during printing;

an optical scanner to optically scan an image of the printed polygon calibration pattern;

a processor; and memory storing instructions executable by the processor to:

calculate a skew angle by which the PWA print bar deviates from true perpendicular to the media advancement direction based on the optically scanned image; and calibrate the printing device to compensate for the calculated skew angle during subsequent printing.

14. The printing device of claim 13, wherein the polygon calibration pattern comprises a checkered pattern of rectangles, and the printed polygon calibration pattern comprises a corresponding checkered pattern of parallelograms.

15. The printing device of claim 14, wherein the instructions are executable by the processor to calculate the skew angle by:

identifying locations of corners of each parallelogram within the optically scanned image;

for each parallelogram, calculating a preliminary skew angle for the parallelogram based on the identified locations of the corners of the parallelogram within the optically scanned image; and calculating the skew angle based on the calculated preliminary skew angle for each parallelogram.

16. The printing device of claim 14, wherein the optical scanner is positioned downstream from the PWA print bar along the media advancement direction, and is to optically scan the image of the printed polygon calibration pattern after the PWA print bar has printed the polygon calibration pattern, without a user having to feed the print medium back into the printing device for optical scanning after printing has occurred.

17. A method comprising:

printing, by a pagewide array (PWA) print bar of a printing device, a polygon calibration pattern on a print medium, the PWA print bar nominally perpendicular to a media advancement direction in which the print medium advances relative to the PWA print bar during printing;

optically scanning, by an optical scanner, an image of the printed polygon calibration pattern;

calculating, by a processor, a skew angle by which the PWA print bar deviates from true perpendicular to the media advancement direction based on the optically scanned image; and calibrating the printing device to compensate for the calculated skew angle during subsequent printing.

18. The method of claim 17, wherein the polygon calibration pattern comprises a checkered pattern of rectangles, the printed polygon calibration pattern comprises a corresponding checkered pattern of parallelograms, and calculating the skew angle comprises:

identifying locations of corners of each parallelogram within the optically scanned image;

for each parallelogram, calculating a preliminary skew angle for the parallelogram based on the identified locations of the corners of the parallelogram within the optically scanned image; and calculating the skew angle based on the calculated preliminary skew angle for each parallelogram.

19. The method of claim 17, wherein the optical scanner is part of a scanning device separate from the printing device, and the processor is part of a computing device separating from the scanning device and the printing device.

* * * * *